Jan. 14, 1958 W. A. COBURN 2,820,150
ELECTRIC POWER DISTRIBUTION SYSTEM AND ELECTRIC
CIRCUIT BREAKER FOR USE THEREIN
Filed March 15, 1955 4 Sheets-Sheet 1

Inventor
Wallace A. Coburn
by Stevens, Davis, Miller & Mosher
his attorney

United States Patent Office 2,820,150
Patented Jan. 14, 1958

2,820,150

ELECTRIC POWER DISTRIBUTION SYSTEM AND ELECTRIC CIRCUIT BREAKER FOR USE THEREIN

Wallace A. Coburn, Brandon, Manitoba, Canada, assignor to C. T. Electrical Controls Limited, Brandon, Manitoba, Canada Application March 15, 1955, Serial No. 494,459

Claims priority, application Canada January 31, 1955

24 Claims. (Cl. 307—35)

This invention relates to an electric power distribution system and to electric circuit breakers for use therein, particularly to electric circuit breakers adapted for use in paralleling the secondaries of a number of transformers supplying domestic and similar loads.

One form of circuit breaker adapted for use in carrying the invention into practice is illustrated in Figures 1 to 4 of the accompanying drawings. In these drawings.

Figure 1:
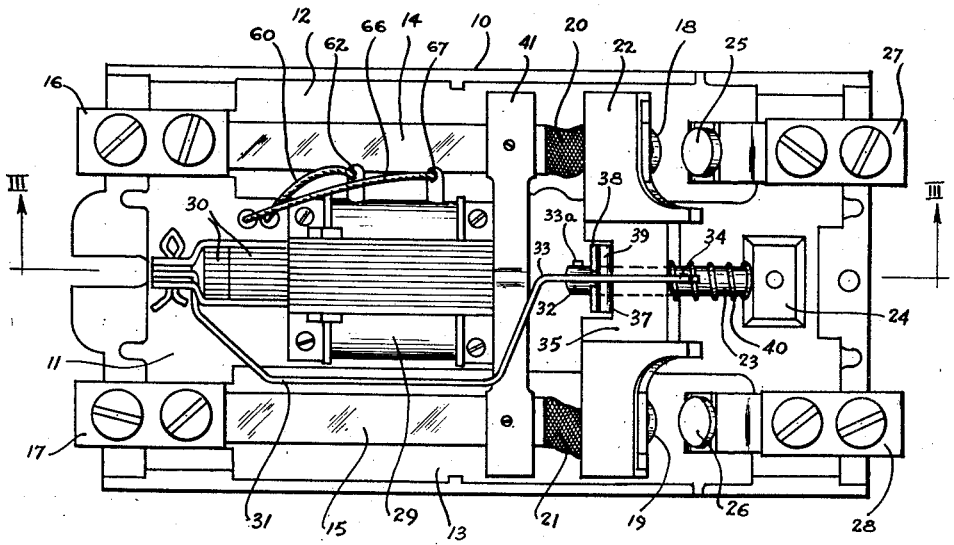
Fig. 1 shows a plan view of this circuit breaker with the cover removed.
Figure 2:
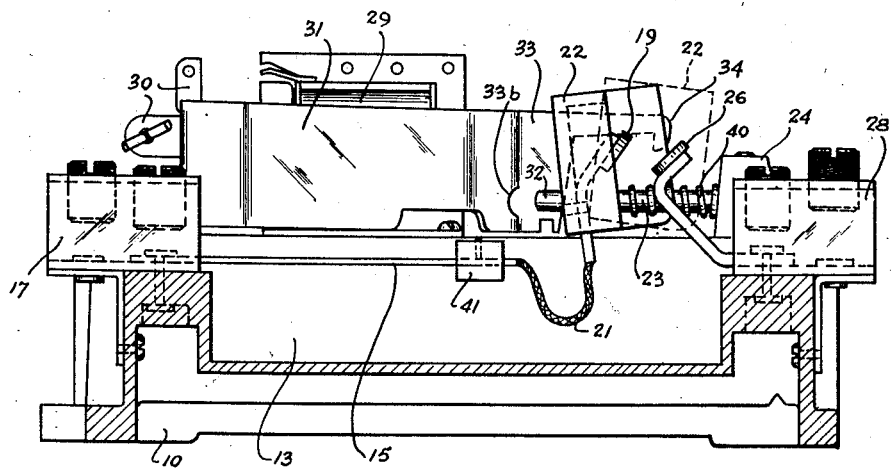
Fig. 2 shows a side view of the circuit breaker seen in Fig. 1, with the side wall of the casing removed in order to reveal certain of the working parts.

The drawings also include two schematic diagrams of power distributing systems each employing a circuit breaker such as illustrated in Figures 1 to 4 and operating in accordance with the present invention. These diagrams form Figures 5 and 6 respectively.

Referring firstly to Figures 1 to 4, the circuit breaker will be seen to be mounted in a shell 10, which is made of a suitable insulating material such as a mouldable synthetic resin. The general arrangement of this shell 10 is similar to that described in Canadian patent application Serial No. 679,866, filed January 27, 1955, in that it has a centrally longitudinally extending raised platform 11 that serves to define a pair of lateral, longitudinally extending cavities 12 and 13 in the upper face of the shell 10, in which cavities are mounted bimetallic strips 14 and 15 extending between terminals 16 and 17 and a pair of movable contacts 18 and 19, to which they are connected by flexible straps 20 and 21. The movable contacts 18 and 19 are mounted on a carrier bar 22 extending transversely across the shell 10 and mounted to slide on a rod 23 which extends along the central axis of such shell from a fixed projection 24 extending upwardly from the platform 11. The movable contacts 18 and 19 co-operate with stationary contacts 25 and 26 which in turn are connected to terminals 27 and 28. Each bimetallic strip with its corresponding pair of co-operating contacts is thus arranged in one of two independent circuits, one extending between terminals 16 and 27 and the other between the terminals 17 and 28.

Figure 3:
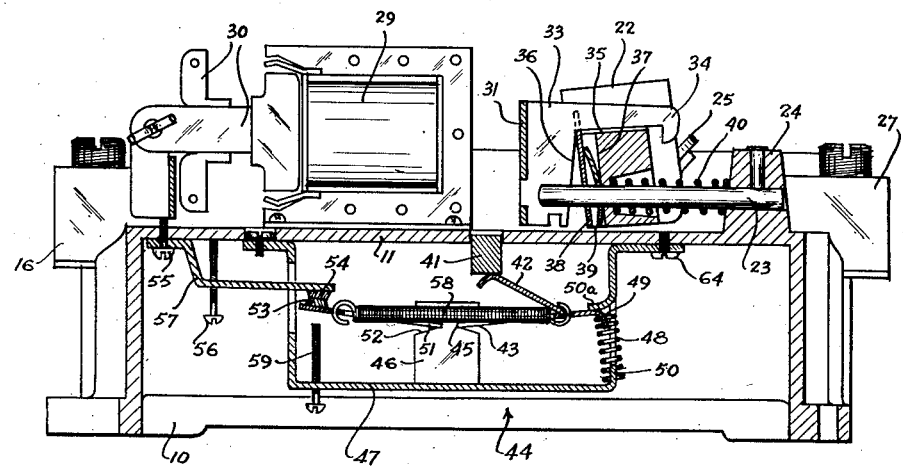
Fig. 3 shows a section on the line III—III in Fig. 1.

Movement of the carrier bar 22, to open and close the contacts is controlled by a solenoid 29, the sliding armature 30 of which is connected to a vertically disposed bent plate 31 which extends around the solenoid 29 to act upon the carrier bar 22. This remote end 33 of the plate 31 slides between the forked end 32 of the rod 23, a bent-out nib 33a formed on the end 33 of the plate 31 underlying the end 32 of the rod 23 to ensure the correct alignment of these parts. As best seen in Figure 3, the end 33 of the plate 31 terminates in a hook 34 which extends over the top of the upper surface 35 of a central cavity on the carrier bar 22, to engage the remote fact of such carrier bar. The end 33 of the plate 31 presents a slightly inclined edge 36 to the inner surface 37 of a centrally disposed cavity formed on the face of the carrier bar 22 nearer the solenoid 29 (see also Fig. 1). Two loosely mounted plates are interposed between the edge 36 of the plate 31 and the surface 37 of the carrier bar 22, these plates lying generally parallel to the surface 37 and serving to transmit the force that the solenoid 29 exerts on the carrier bar 22 when it is required to move such carrier bar to the right to close the contacts. The first such plate 38 is rigid and abuts the edge 36. The second plate 39 which lies between the plate 38 and the surface 37 is a curved plate of spring steel or like resilient material. Both plates are perforated to slide along the rod 23 and the plate 38 has a forked upper part embracing the end 33 of the plate 31 to ensure that the plate 38 remains erect. The effect of transmitting the force through the plates 38 and 39, on closing of the circuit breaker by the solenoid 29, is similar to the effect described in connection with the closing of the circuit breaker illustrated in said prior application, wherein a horizontally extending ridge is formed on the corresponding part of the carrier bar. In the present invention closing movement of the solenoid 29 slides the plate 31 to the right and this presses the plate 38 against the plate 39 which in turn bears against the surface 37 of the carrier bar 22. A hole 33b in the end 33 permits the plate 31 to slide over the end 32 of the rod 23. Movement to the right is resisted by a coil spring 40 mounted on the rod 23 and extending between the projection 24 and a recessed surface on the carrier bar 22. The solenoid is however more powerful than the spring 40 and the carrier bar 22 continues to be moved to the right. The plate 38 is tilted somewhat clockwise from the slack position shown in Figure 3 by reason of the slope of the edge 36 and this causes the convex surface of the spring plate 39 to press against the surface 37 of the carrier bar along a horizontal line higher than the mean point of application of pressure on said carrier bar by the spring 40. This tends to exert a clockwise turning moment on the carrier bar 22 as viewed in Figures 2 and 3 and thus to tilt the same forwardly to the position indicated by the broken lines in Figure 2. Towards the latter stages of the movement to the right, the moving contacts 18 and 19 come to bear against the stationary contacts 25 and 26, and, since the level of these contacts is above that of the line of pressure between the spring plate 39 and the surface 37 of the carrier bar 22, the effect of the pressure between the contacts is movement of the carrier bar into a more erect position, that is a slight anticlockwise rotation. This rotation produces a wiping action between each pair of contacts, similar to the wiping action described in said prior application. Finally, the spring plate 39 becomes distorted from its arched configuration to a more flat form, the contacts 18 and 19 being pressed firmly against the stationary contacts 25 and 26. The circuit breaker is then in the fully closed position. On de-energization of the solenoid 29, substantially reverse operation to that described takes place.

The circuit breaker at present being described, has a further feature in common with the circuit breaker described in the said prior application, in that the bimetallic strips 14 and 15 each act on one end of a totalizing bar 41. The function of this bar 41 is fully described in said prior application, and in Canadian patent application No. 563,388. As best seen from Figure 3, a centrally disposed surface on the bar 41 bears against an upwardly projecting tongue 42 of a swinging plate 43 of a micro-switch 44. The plate 43 is forked, as seen from Figure 4, and its two legs are mounted in grooves 45 formed in ears 46 of a cover plate 47 of the micro-switch 44. The cover plate 47 is partly cut away in Figure 4 to reveal the working parts of the micro-switch. The free end of the plate 43 is acted upon by a coil spring 48 which extends between a nib 49 on the end of the plate 43 and a similar nib 50 formed at one end of an aperture formed in the cover plate 47 of the microswitch. The spring 48 presses the free end of the plate 43 against a stop 50a formed at the other end of said aperture by an inturned lip of the cover plate 47.

The micro-switch 44 also includes a second forked swinging plate 51 mounted in grooves 52 on the ears 46, said plate 51 carrying at its free end a contact 53 positioned for co-operation with a stationary contact 54 mounted on an arm 57 extending through an aperture in the cover plate 47 from a fixing screw 55 on the platform 11. A screw 56 projects through the arm 57 and bears against the undersurface of such platform to provide means for adjusting the position of the contacts 54. The plate 51 is connected to the plate 43 by means of a tension spring 58 extending centrally along the microswitch 44 between the respective free ends of such plates. On occurrence of an overload for which it is required to open the circuit breaker, the centre portion of the totalizing bar 41 will have been moved downwardly by the bimetallic strips 14 and 15 a sufficient extent to cause the tongue 42 to move the plate 43 over centre in respect of the grooves 45 in which it is supported and the longitudinal axis of the tension spring 58. This will cause the plate 45 to snap over rapidly into the position opposite to that shown in Figure 3, which action will re-align the longitudinal axis of the spring 58 so that it extends below the line joining the inner points of the groves 52 in which the plate 51 is supported, thus causing such plate 51 also to snap over from the position shown in Figure 3 to a position in which it bears against a stop provided to limit this movement of the switch. This stop takes the form of an adjusting screw 59.

Subsequent upward movement of the centre of the totalizing bar 41 will cause a reverse operation to take place, since the plate 43 is urged upwardly by the spring 48. As soon as the plate 43 has passed over centre, the tension spring 58 will swing back past the line of the grooves 52 so that the contact bearing plate 51 will also be snapped back into its former position. This movement will serve to re-engage the contacts 53 and 54 that will have been opened by the initial operation of the switch.

Figure 4:
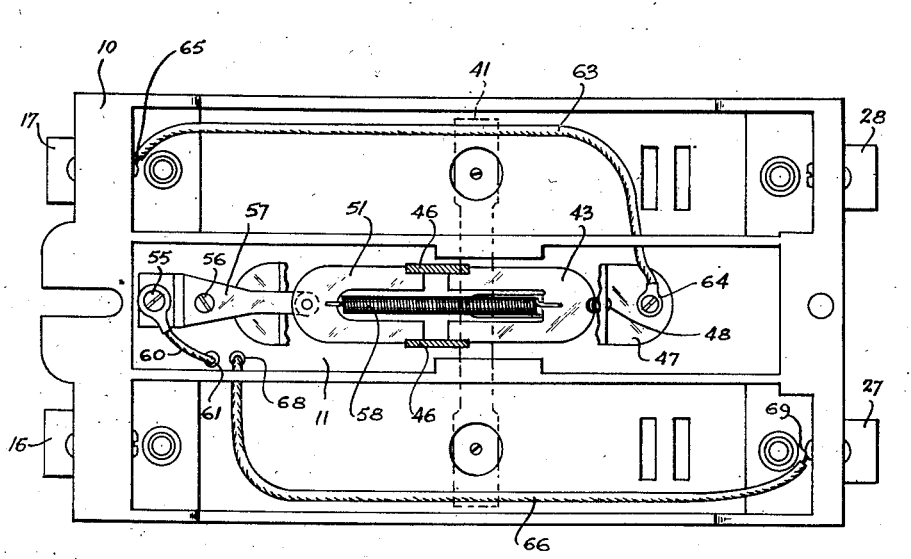
Fig. 4 shows an underside plan view of the circuit breaker seen in Figures 1 to 3.

The connecting leads have been omitted from Figure 3 for clarity, but are shown in Figures 1 and 4, from which it will be seen that a lead 60 extends from the fixing screw 55 of the arm 57 carrying the contact 54, through an aperture 61 in the platform 11 of the switch, to a terminal 62 of the solenoid 29. Another lead 63 extends from a screw connection 64 on the cover plate 47 of the micro-switch 44 (such cover plate being electrically connected to the plate 51 by virtue of the latter's mounting in the grooves 52), along the underside of the circuit breaker, to be connected at 65 to the terminal 17. A third lead 66 extends from a second terminal 67 on the solenoid 29, down through an aperture 68 in the platform 11 to be connected at 69 to the terminal 27.

Figure 5:
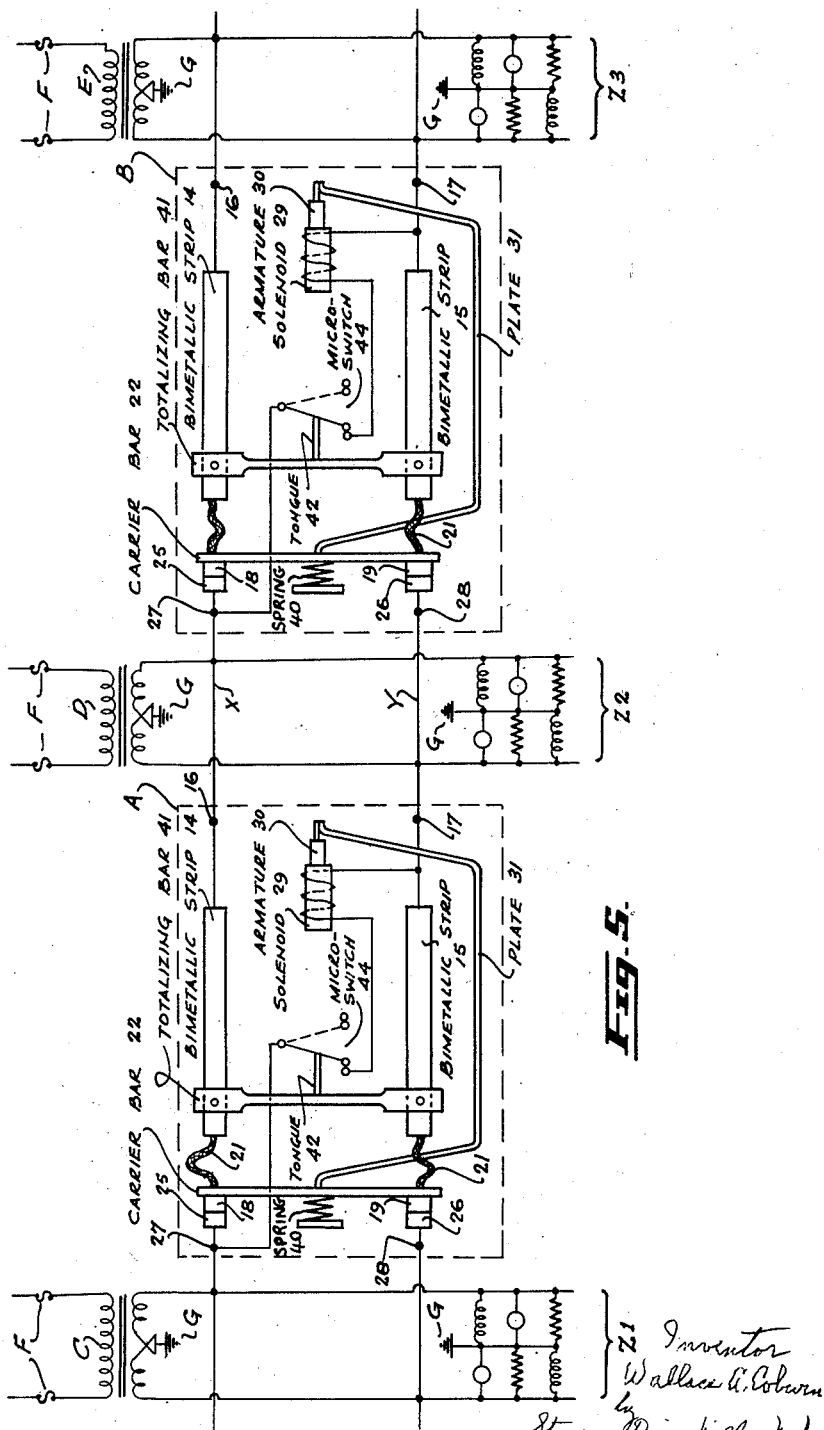
Figs. 5 and 6 illustrate a system including the circuit breaker disclosed.

The overall layout of the circuit breaker illustrated in Figures 1 to 4 is best seen from the diagram of Figure 5 which shows how the solenoid 29 and the micro-switch 44 are connected as a series circuit between the terminal 17 and 27 which are each arranged in one of the two circuits controlled by the circuit breaker, said terminals being arranged respectively on opposite sides of the breaks formed by the contacts 18 and 25; 19 and 26.

The operation of this circuit breaker and its method of connection in a single phase supply circuit will not be described with reference to Figure 5 which shows two similar such circuit breakers A and B connected in lines X and Y extending between the secondaries of three, three-wire, single-phase supply transformers C, D and E, arranged in the so-called Edison three-wire connection. Each such transformer supplies a number of loads represented by the sets of various symbols designated Z1, Z2 and Z3. It may for convenience be assumed that the system operates with 230 volts across the outside terminals of the secondary of each of the transformers and with 115 volts between each of such terminals and the earth points shown as G. This is a very common form of distributing circuit employed particularly in rural areas. Each of the transformers C, D and E has a pair of fuses F arranged in the primary side of each such transformer. Circuit breakers could, of course, be used as alternatives to the fuses.

The purpose of paralleling the secondaries of each of these transformers is to enable one transformer to supply a limited amount of load to a circuit normally fed by another transformer should the load on such other transformer be momentarily in excess of that which can be safely drawn through it. Also, as a matter of practice, these paralleling circuit breakers have the effect of distributing the loads between adjacent transformers more evenly than would be the case if the transformers were operatnig independently, thus providing the system with a flexibility which would not exist were each transformer to supply strictly its own load. Only a proportion of the power supplied to each load Z will normally flow through the parallel connections. Taking a specific example that might be encountered in practice, loads Z1, Z2 and Z3 could be, say, 230 amps., 700 amps. and 550 amps. maximum respectively. The transformers C, D and E might be such as to supply, say 330 amps., 500 amps. and 650 amps., so that when the full 700 amps. is being drawn by the load Z2, 200 amps will require to be supplied by the neighbouring transformers. The setting of each of the two circuit breakers might then conveniently be 100/150 amps., which means that the breakers will trip on a predetermined overload say 25% of a balanced load of 100 amps. in each conductor or a totally unbalanced load of 150 amps. in a single conductor, the manner in which this operation is achieved being fully explained in the two said prior applications.

Let it now be assumed that a serious overload, such as a short circuit, occurs on the central load Z2, i. e. that fed primarily from the transformer D. In addition to drawing a heavy current from such transformer D the fault will be fed through each of the circuit breakers A and B. After a very short period during which the bimetallic strips are being heated by these overload currents, both the circuit breakers will open, thus isolating the faulty circuit from the circuits fed by transformers C and E and other transformers which are in turn paralleled to such transformers C and E, it being understood that Figure 5 shows only a small section of a continuous system of paralleled transformers. Also, the fuses F in the circuit of the transformer D will fail. It should be noted that each of the circuit breakers A and B will have opened by virtue of opening of the micro-switch 44 on movement of the totalizing bar 41 in accordance with deflection of the heated bimetallic strips 14 and 15, such opening of the micro-switches 44 acting to open the circuit to the solenoid 29 which thus allowed the spring 40 to take charge and move the carrier bar 22 to the open position.

No potential will now exist across the secondary of the transformer D and, taking the lefthand circuit breaker A as an example, there will no longer be the 230 volts applied between the terminals 17 and 27, as is required to operate the solenoid 29. Accordingly, even when the micro-switch 44 recloses, which it is normally timed to do after about 4 minutes (this timing being regulated by the setting of the parts of the micro-switch and the rate of heat dissipation from the bimetallic strips 14 and 15), the solenoid 29 will still not be reenergized. Since the terminal 17 is connected to earth through the unenergized load Z2, such terminal 17 will be at earth potential. On the other hand, there will be a voltage of 115 volts between earth and the terminal 27, as determined by the secondary of the transformer C. There will thus be one-half voltage across the solenoid 29 when the micro-switch 44 eventually recloses. This will provide a power in the solenoid of only one-quarter of its normally operating power, which will be insufficient to reclose the circuit breaker.

Both the circuit breakers A and B will thus remain open until steps have been taken to clear the fault on the load Z2 and to replace the fuses F in the circuit of the primary of the transformer D, or to reclose the circuit breaker supplying such transformer if a circuit breaker is used instead of such fuses. As soon as power is restored to the system supplied by the transformer D, the potential across terminals 17 and 27 will immediately become the full line voltage of 230 volts. The solenoid 29 of each circuit breaker wil be re-energized and the moving contacts 18 and 19 will again be brought into engagement with their co-operating stationary contacts 25 and 26. The system fed by the transformers C, D and E will thus immediately be parallel as soon as power is restored to the transformer D.

It will thus be seen that a system of operation has been achieved which automatically disconnects a number of transformer secondaries normally operating in parallel as soon as too heavy an overload occurs on the load assigned to any one transformer. The provision of a time delay in reclosing of the micro-switches 44 ensures that the circuit breakers A and B will not continually open and reclose onto an intermittent fault, there being ample time for either the fault to clear or the fuses in the affected transformer to fail and disconnect such transformer from its primary supply. Additionally, the system has the great merit that the paralleling circuit breakers will automatically reclose when the faulty system has been corrected and the supply of power has been restored to the transformer feeding such system.

Figure 6:
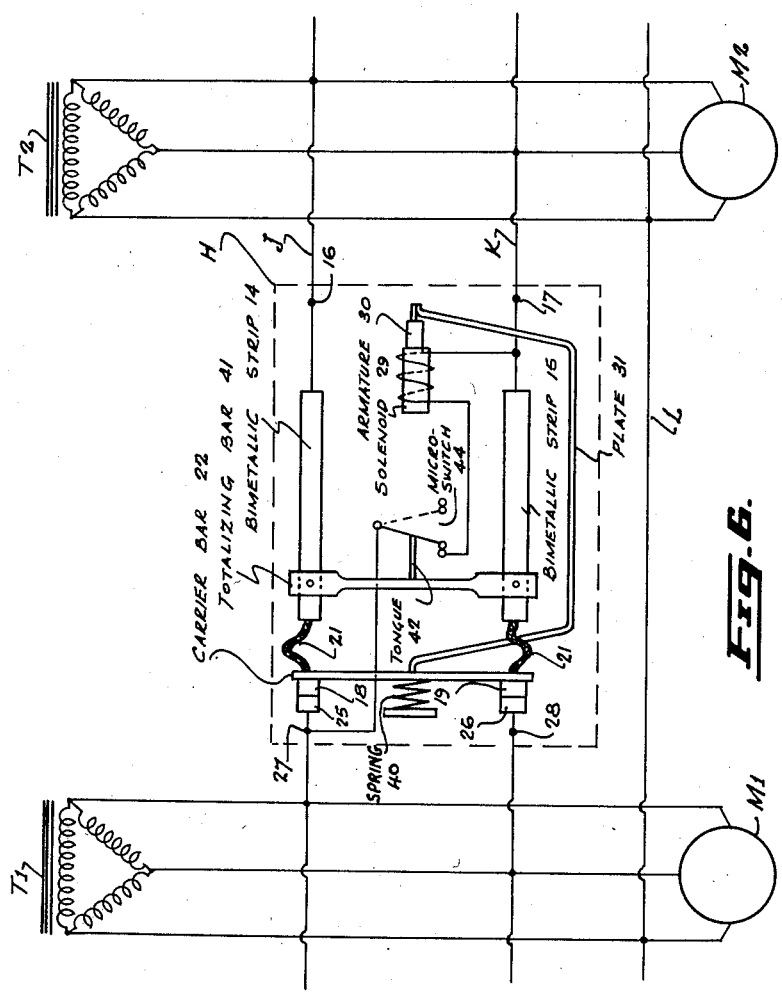

A use of the circuit breaker in a three-phase supply circuit is illustrated in Fig. 6. This diagram shows the delta connected secondaries of a pair of three-phase transformers T1 and T2 each supplying a balanced load such as motors M1 and M2. As before, the parts illustrated will normally form only part of a larger number of parallel connected transformers. The circuit breaker, here shown generally at H, is arranged in two lines J and K interconnecting two phases of the secondaries, the third line L being uninterrupted. The full line-to-line voltage of the secondaries (assuming their outputs to be substantially identical in voltage and phase) will then be available across the solenoid when the micro-switch is closed. The circuit breaker will open on overload as before and the transformer feeding into the fault will be isolated by its protective devices. One or other of the terminals 17 and 27 will then be disconnected from a source of supply thus preventing the circuit breaker reclosing until the fault has been cleared.

In practice, the various secondaries that are to be connected in parallel will each be a winding of a separate transformer. Nonetheless, the method of the invention would be equally applicable in circumstances where it was required to connect in parallel two or more secondary windings of the same transformer. In this case, i. e. where a common primary winding was employed, it would, of course, be necessary to place the fuses or other protective devices in the secondary circuits, if isolation of a faulty load connected to one of such secondary circuits were to be achieved.

Furthermore, it is not essential that the two ends of the series circuit formed by the solenoid and the micro-switch controlling tripping of the breaker be connected between one stationary contact and one movable contact of the circuit breaker. This circuit could be connected between either the two stationary contacts or the two movable contacts, although in these cases it will be necessary to connect the leads paralleling the two adjacent transformer secondaries differently to the circuit breaker so that the essential connection is achieved, i. e. that the series circuit of the solenoid and switch is connected between one end terminal of one of said secondaries and an electrically opposite or electrically different end terminal of the other said secondary.

Thus, in its broad concept, the invention consists of an electric power distribution system comprising transformer means having two secondaries adapted for parallel operation, two loads, means connecting such loads individually each to one of said secondaries, and a circuit breaker connected for paralleling the terminals of said secondaries, said circuit breaker comprising electrically actuated operating means connected between a terminal of one of said secondaries and an electrically different terminal of the other said secondary.

I claim:

1. An electric power distribution system, comprising transformer means having two secondaries adapted for parallel operation, two loads, means connecting such loads individually each to one of said secondaries, and a circuit breaker connected for paralleling the terminals of said secondaries, said circuit breaker comprising electrically actuated operating means connected between a terminal of one of said secondaries and an electrically different terminal of the other said secondary.

2. An electric power distribution system comprising transformer means having two single phase secondaries adapted for parallel operation, two loads, means connecting such loads individually each to one of said secondaries, and a circuit breaker connected for paralleling the terminals of said secondaries, said circuit breaker comprising electrically actuated operating means connected between one terminal of one of said secondaries and the electrically opposite terminal of the other said secondary.

3. An electric power distribution system comprising transformer means having two centre-tapped single phase secondaries adapted for parallel operation, means interconnecting the centre tap terminals of said secondaries, two loads, means connecting such loads individually each to one of said secondaries, and a circuit breaker connected for paralleling the terminals of said secondaries, said circuit breaker comprising electrically actuated operating means connected between one end terminal of one of said secondaries and the electrically opposite end terminal of the other said secondary.

4. A system as claimed in claim 1, including means for tripping the circuit breaker on passage through the circuit breaker of currents in excess of predetermined values.

5. A system as claimed in claim 1, including a switch in series with said operating means, and means sensitive to the passage of current through the circuit breaker and adapted to open said switch on the occurrence of a predetermined overload condition.

6. A system as claimed in claim 1, including a protective device associated with each secondary and adapted to interrupt supply of current to the load fed by said secondary on passage through said secondary of currents in excess of predetermined values.

7. An electric power distribution system comprising transformer means having two three-phase three-wire secondaries adapted for parallel operation, means interconnecting a pair of corresponding terminals of the first phase of said secondaries, two balanced three-phase loads, means connecting such loads individually each to one of said secondaries, and a circuit breaker connected for paralleling the terminals of the second and third phases of said secondaries, said circuit breaker comprising electrically actuated operating means connected between the second phase terminal of one of said secondaries and the third phase terminal of the other said secondary.

8. An electric power distribution system comprising two transformers interconnected on their primary sides and each having a centre-tapped single phase secondary adapted for operation in parallel with the other secondary, protective means arranged in the circuit of each primary and adapted to interrupt supply of current thereto on passage therethrough of a current in excess of a predetermined value, means interconnecting the centre tap terminals of said secondaries, two loads, means connecting said loads individually each to one of said secondaries, and a circuit breaker connected for paralleling the end terminals of said secondaries, said circuit breaker comprising electrically actuated operating means connected between one end terminal of one of said secondaries and the electrically opposite end terminal of the other said secondary.

9. A system as claimed in claim 7, including means for tripping the circuit breaker on passage therethrough of currents in excess of predetermined values.

10. A system as claimed in claim 7, including a switch in series with said operating means, and means sensitive to passage of current through the circuit breaker and adapted to open said switch on the occurrence of a predetermined overload condition.

11. An electric power distribution system comprising transformer means having two centre-tapped single phase secondaries, means interconnecting the centre tap terminals of said secondaries, two loads, means connecting such loads individually each to one of said secondaries, and a circuit breaker connected for paralleling the two end terminals of said secondaries, said circuit breaker comprising a pair of stationary contacts, a pair of ganged movable contacts each co-operating with one of said stationary contacts, electrically actuated operating means for moving said movable contacts into contacts-engaged position to establish a pair of independent circuits each connecting one of the end terminals of one of said secondaries to the corresponding terminal of the other such secondary, said operating means being connected to two of the four contacts of the circuit breaker so as to be connected between one end terminal of one of said secondaries and the electrically opposite end terminal of the other such secondary.

12. A system as claimed in claim 11, including means for tripping the circuit breaker on passage through said independent circuits of currents in excess of predetermined values.

13. A system as claimed in claim 11, including a switch in series with said operating means, and mean ssensitive to the passage of currents in said independent circuits and adapted to open said switch on the occurrence of a predetermined overload condition.

14. A system as claimed in claim 13, wherein said switch opening means are adapted to maintain such switch open for a predetermined time interval after the opening thereof.

15. A system as claimed in claim 11, including a protective device associated with each secondary and adapted to interrupt supply of current to the load fed by said secondary on passage through said secondary of currents in excess of predetermined values.

16. A system as claimed in claim 11, including means for tripping the circuit breaker, a totalizing bar, and a pair of bimetallic elements arranged to be heated each by the current in one of said independent circuits and each co-acting with one end of said bar to move an intermediate part thereof by an amount dependent upon the total current flowing in both said circuits, said intermediate part being operative on said tripping means.

17. A system as claimed in claim 16, wherein said tripping means comprise a switch arranged in series with said electrically actuated operating means and connected for operation by said intermediate part of the totalizing bar.

18. An electric power distribution system comprising two transformers interconnected on their primary sides and each having a centre-tapped single phase secondary adapted for operation in parallel with the other secondary, protective means arranged in the circuit of each primary and adapted to interrupt supply of current thereto on passage therethrough of a current in excess of a predetermined value, means interconnecting the centre tap terminals of said secondaries, two loads, means connecting said loads individually each to one of said secondaries, and a circuit breaker connected for paralleling the two end terminals of said secondaries, said circuit breaker comprising a pair of stationary contacts, a pair of ganged movable contacts each co-operating with one of said stationary contacts, electrically actuated operating means for moving said movable contacts into contacts-engaged position to establish a pair of independent circuits each connecting one of the end terminals of one of said secondaries to the corresponding terminal of the other such secondary, said operating means being connected to two of the four contacts of the circuit breaker so as to be connected between one end terminal of one of said secondaries and the electrically opposite end terminal of the other such secondary.

19. An electric circuit breaker comprising a pair of stationary contacts, a pair of ganged movable contacts mounted for co-operation with each of said stationary contacts whereby to make and break a pair of independent electric circuits, a solenoid, an armature movable by said solenoid and connected to said movable contacts to move them to contacts-engaged position on actuation of said solenoid, spring means urging said movable contacts to contacts-disengaged position, a totalizing bar, a pair of bimetallic elements each arranged to be heated by the current in one of said independent circuits and each acting on one end of said totalizing bar, a switch having contacts in series with said solenoid and being arranged for actuation by a part of said totalizing bar intermediate its ends, the series circuit formed by said solenoid and said switch being connected between one contact of each of said independent circuits.

20. An electric circuit breaker as claimed in claim 19, wherein said series circuit is connected between a terminal connected to one of said stationary contacts and a terminal connected to the movable contact co-operating with the other stationary contact.

21. An electric circuit breaker comprising a pair of stationary contacts, a pair of ganged movable contacts mounted for co-operation each with one of said stationary contacts whereby to make and break a pair of independent electric circuits, a solenoid, an armature movable by said solenoid and connected to said movable contacts to move them to contacts-engaged position on actuation of said solenoid, spring means urging said movable contacts to contacts-disengaged position, a totalizing bar, a pair of bimetallic elements each connected at one end to one of said movable contacts and at its other end to a fixed terminal and each acting on one end of said totalizing bar, a switch arranged for operation by a part of said totalizing bar intermediate its said ends, the contacts of said switch being arranged in series with said solenoid between one of said stationary contacts and the terminal connected to the bimetallic element arranged in the circuit of the other said stationary contact.

22. An electric circuit breaker comprising a pair of stationary contacts, a pair of ganged movable contacts mounted for cooperation with each of said stationary contacts whereby to make and break a pair of independent electric circuits, a solenoid, an armature movable by said solenoid and connected to said movable contacts to move them to contacts-engaged position on actuation of said solenoid, spring means urging said movable contacts to contacts-disengaged position, means sensitive to overload conditions in said independent circuits, and a switch having contacts in series with said solenoid and being arranged for actuation by said overload sensitive means, the series circuit formed by said solenoid and said switch being connected between one of said contacts of each of said independent circuits.

23. In an electric power system having at least two portions thereof adapted for parallel operation, a circuit breaker connected for paralleling said portions, said circuit breaker comprising electrically actuated operating means connected between one conductor of one such portion and an electrically different conductor of the other said portion.

24. An electric circuit breaker comprising a pair of stationary contacts, a pair of ganged movable contacts mounted for co-operation each with a respective one of said stationary contacts whereby to make and break a pair of independent electric circuits, a solenoid for controlling movement of said movable contacts to contacts-engaged position, means urging said movable contacts to contacts-disengaged position, means sensitive to overload conditions in said independent circuits, and a switch having contacts in series with said solenoid and being arranged for actuation by said overload sensitive means, the series circuit formed by said solenoid and said switch being connected between one of said contacts of each of said independent circuits.

References Cited in the file of this patent
UNITED STATES PATENTS

| | | |
|---|---|---|
| 1,893,356 | Blake | Jan. 3, 1933 |
| 2,018,225 | Parsons | Oct. 22, 1935 |
| 2,521,171 | Kercher | Sept. 5, 1950 |